United States Patent
Inokuchi et al.

(10) Patent No.: US 11,452,118 B2
(45) Date of Patent: Sep. 20, 2022

(54) APPARATUS AND METHOD FOR CONTROLLING DEVICE-TO-DEVICE COMMUNICATION

(71) Applicant: NEC CORPORATION, Tokyo (JP)

(72) Inventors: Masaki Inokuchi, Tokyo (JP); Kazushi Muraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 745 days.

(21) Appl. No.: 16/086,039

(22) PCT Filed: Jan. 12, 2017

(86) PCT No.: PCT/JP2017/000759
§ 371 (c)(1),
(2) Date: Sep. 18, 2018

(87) PCT Pub. No.: WO2017/163545
PCT Pub. Date: Sep. 28, 2017

(65) Prior Publication Data
US 2020/0296738 A1 Sep. 17, 2020

(30) Foreign Application Priority Data
Mar. 23, 2016 (JP) .............................. JP2016-058487

(51) Int. Cl.
*H04W 72/12* (2009.01)
*H04W 88/04* (2009.01)
*H04W 92/18* (2009.01)

(52) U.S. Cl.
CPC ... *H04W 72/1226* (2013.01); *H04W 72/1268* (2013.01); *H04W 72/1284* (2013.01); *H04W 88/04* (2013.01); *H04W 92/18* (2013.01)

(58) Field of Classification Search
CPC ......... H04W 72/1226; H04W 72/1268; H04W 72/1284; H04W 88/04; H04W 92/18;
(Continued)

(56) References Cited

U.S. PATENT DOCUMENTS

2013/0322276 A1* 12/2013 Pelletier ............ H04L 2101/622
370/252
2013/0322388 A1* 12/2013 Ahn ...................... H04W 76/14
370/329

(Continued)

FOREIGN PATENT DOCUMENTS

| CN | 106454992 B | * | 6/2020 |
|---|---|---|---|
| JP | 2013-532430 A | | 8/2013 |
| KR | 20160134438 A | * | 11/2016 |

OTHER PUBLICATIONS

3GPP TSG RAN WG1 Meeting #76bis, Operation Mode 1 resource allocation for D2D communication, LG Electronics, R1-141352, Mar. 31-Apr. 4, 2014, 3 pages (Year: 2014).*

(Continued)

*Primary Examiner* — Ayaz R Sheikh
*Assistant Examiner* — Louis Samara
(74) *Attorney, Agent, or Firm* — Sughrue Mion, PLLC

(57) ABSTRACT

An apparatus (1 or 3) determines a device-to-device (D2D) radio resource to be allocated to one or more D2D transmissions from at least one remote terminal (1) to a first relay terminal (2) while considering a quality metric of an uplink from the first relay (2) terminal to a base station (3). In this way, for example, it is possible to contribute to avoiding inconsistency of performance between sidelink transmission from the remote terminal to the relay terminal and uplink transmission from the relay terminal to the base station.

20 Claims, 10 Drawing Sheets

(58) Field of Classification Search
CPC . H04W 76/14; H04W 24/02; H04W 72/1242; H04W 72/0413; H04W 72/0453; H04W 52/265; H04L 1/00
See application file for complete search history.

(56) References Cited

U.S. PATENT DOCUMENTS

| | | | | |
|---|---|---|---|---|
| 2014/0334318 A1* | 11/2014 | Pica | ............... | H04W 36/08 |
| | | | | 370/252 |
| 2015/0312821 A1* | 10/2015 | Yamazaki | ............ | H04W 36/023 |
| | | | | 370/338 |
| 2015/0351089 A1* | 12/2015 | Li | ............... | H04W 52/265 |
| | | | | 455/552.1 |
| 2016/0212721 A1* | 7/2016 | Sheng | ............... | H04W 76/14 |
| 2016/0242048 A1* | 8/2016 | Pelletier | ............ | H04W 24/02 |
| 2017/0013638 A1* | 1/2017 | Takahashi | ......... | H04W 72/1284 |
| 2018/0213549 A1* | 7/2018 | Kim | ............... | H04W 72/1268 |
| 2019/0014490 A1* | 1/2019 | Kim | ............... | H04W 88/04 |
| 2019/0089451 A1* | 3/2019 | Seo | ............... | H04W 88/04 |
| 2020/0229260 A1* | 7/2020 | Kwon | ............... | H04W 76/14 |

OTHER PUBLICATIONS

3GPP TS 23.303 V12.7.0 (Dec. 2015), "3rd Generation Partnership Project; Technical Specification Group Services and System Aspects; Proximity-based services (ProSe); Stage 2 (Release 12)", Dec. 2015, 58 pages.

3GPP TS 36.213 V12.5.0 (Mar. 2015), "3rd Generation Partnership Project; Technical Specification Group Radio Access Network; Evolved Universal Terrestrial Radio Access (E-UTRA); Physical layer procedures (Release 12)", Mar. 2015, 239 pages.

3GPP TR 23.713 V13.0.0 (Sep. 2015), "3rd Generation Partnership Project; Technical Specification Group Services and System Aspects; Study on extended architecture support for proximity-based services (Release 13)", Sep. 2015, 80 pages.

3GPP R1-152778, "Support of UE-Network relays", Qualcomm Incorporated, May 25-29, 2015, 10 pages.

3GPP S2-150925, "UE-to-Network Relay conclusions", Qualcomm Incorporated, Apr. 13-17, 2015, 4 pages.

3GPP R1-153087, "Discussion on UE-to-Network Relay measurement", Sony, May 25-29, 2015, 4 pages.

3GPP R2-152560, "Role of eNB when remote UE is in coverage", Qualcomm Incorporated, May 25-29, 2015, 5 pages.

3GPP R1-151965, "Views on UE-to-Network Relay Discovery", NTT Docomo, Apr. 20-27, 2015, 6 pages.

3GPP R1-153188, "Discussion on Relay Selection", NTT Docomo, May 25-29, 2015, 4 pages.

LG Electronics, Operation in Mode 1 resource allocation for D2D communication, 3GPP TSG RAN WG1 Meeting #76bis, R1-141352, Mar. 31-Apr. 4, 2014, 3 pages.

International Search Report for PCT/JP2017/000759 dated Mar. 28, 2017 [PCT/ISA/210].

* cited by examiner

APPARATUS AND METHOD FOR CONTROLLING DEVICE-TO-DEVICE COMMUNICATION

CROSS REFERENCE TO RELATED APPLICATIONS

This application is a National Stage of International Application No. PCT/JP2017/000759 filed Jan. 12, 2017, claiming priority based on Japanese Patent Application No. 2016-058487 filed Mar. 23, 2016, the disclosure of which is incorporated herein in its entirety by reference.

TECHNICAL FIELD

The present disclosure relates to inter-terminal direct communication (i.e., device-to-device (D2D) communication) and, in particular, to allocation of radio resources for D2D communication.

BACKGROUND ART

A type of communication in which a wireless terminal directly communicates with another wireless terminal without going through an infrastructure network such as a base station is called device-to-device (D2D) communication. The D2D communication includes at least one of Direct Communication and Direct Discovery. In some implementations, a plurality of wireless terminals supporting D2D communication form a D2D communication group autonomously or under the control of a network, and communicate with another wireless terminal in the formed D2D communication group.

Proximity-based services (ProSe) specified in 3GPP Release 12 is one example of the D2D communication (see, for example, Non Patent Literature 1). ProSe Direct Discovery is performed through a procedure in which a wireless terminal capable of performing ProSe (i.e., ProSe-enabled User Equipment (UE)) discovers another ProSe-enabled UE only by using the capability of a radio communication technology (e.g., Evolved Universal Terrestrial Radio Access (E-UTRA) technology) of those two UEs. ProSe Direct Discovery may be performed by three or more ProSe-enabled UEs.

ProSe Direct Communication enables establishment of a communication path between two or more ProSe-enabled UEs existing in a direct communication range after the ProSe Direct Discovery procedure is performed. Stated differently, ProSe Direct Communication enables a ProSe-enabled UE to directly communicate with another ProSe-enabled UE without going through a Public Land Mobile Network (PLMN)) including a base station (eNodeB (eNB)). ProSe Direct Communication may be performed by using a radio communication technology (i.e., E-UTRA technology) that is also used to access a base station (eNB) or by using a Wireless Local Area Network (WLAN) radio technology (i.e., IEEE 802.11 radio technology).

In 3GPP Release 12, a radio link between wireless terminals used for Direct Communication or Direct Discovery is referred to as a Sidelink (see, for example, Section 14 in Non Patent Literature 2). Sidelink transmission uses the Long Term Evolution (LTE) frame structure defined for uplink and downlink and uses a subset of uplink resources in frequency and time domains. A wireless terminal (i.e., UE) performs sidelink transmission by using Single Carrier FDMA (Frequency Division Multiple Access) (SC-FDMA), which is the same as used in uplink.

In 3GPP Release 12 ProSe, allocation of radio resources to a UE for sidelink transmission is performed by a radio access network (e.g., Evolved Universal Terrestrial Radio Access Network (E-UTRAN)). A UE that has been permitted to perform sidelink communication by a ProSe function performs ProSe Direct Discovery or ProSe Direct Communication by using radio resources allocated by a radio access network node (e.g., eNB (eNB)).

As for ProSe Direct Communication, two resource allocation modes, i.e., scheduled resource allocation and autonomous resource selection, are defined. The scheduled resource allocation and the autonomous resource selection are referred to as "sidelink transmission mode 1" and "sidelink transmission mode 2", respectively (see Section 14 in Non Patent Literature 2).

In the scheduled resource allocation for ProSe Direct Communication, when a UE desires to perform sidelink transmission, this UE requests an eNB to allocate radio resources for sidelink transmission, and the eNB allocates resources for sidelink control and data to the UE. To be specific, a UE transmits to an eNB a scheduling request to request an uplink (UL) data transmission resource (i.e., Uplink Shared Channel (UL-SCH) resource) and then transmits a Sidelink Buffer Status Report (Sidelink BSR) to the eNB by using an UL data transmission resource allocated by an uplink grant (UL grant). The eNB determines sidelink transmission resources to be allocated to the UE based on the Sidelink BSR and transmits a sidelink grant (SL grant) to the UE.

The SL grant is defined as Downlink Control Information (DCI) format 5. The SL grant (i.e., DCI format 5) contains contents such as a Resource for PSCCH, Resource block assignment and hopping allocation, and a time resource pattern index. The Resource for PSCCH indicates radio resources for a sidelink control channel (i.e., Physical Sidelink Control Channel (PSCCH)). The Resource block assignment and hopping allocation is used to determine frequency resources, i.e., a set of subcarriers (resource blocks), for transmitting a sidelink data channel (i.e., Physical Sidelink Shared Channel (PSSCH)) for sidelink data transmission. The Time resource pattern index is used to determine time resources, i.e., a set of subframes, for transmitting the PSSCH. Note that, strictly speaking, the resource block means time-frequency resources in LTE and LTE-Advanced and is a unit of resources specified by consecutive OFDM (or SC-FDMA) symbols in the time domain and consecutive subcarriers in the frequency domain. In the case of Normal cyclic prefix, one resource block includes 12 consecutive OFDM (or SC-FDMA) symbols in the time domain and 12 subcarriers in the frequency domain. That is, the Resource block assignment and hopping allocation and the Time resource pattern index designate a resource block for transmitting the PSSCH. The UE (i.e., a sidelink transmission terminal) determines a PSCCH resource and a PSSCH resource according to the SL grant.

On the other hand, in the autonomous resource selection for ProSe Direct Communication, a UE autonomously selects resources for sidelink control (i.e., PSCCH) and data (i.e., PSSCH) from a resource pool(s) set by an eNB. The eNB may allocate a resource pool(s) for the autonomous resource selection to the UE in a System Information Block (SIB) 18. The eNB may allocate a resource pool for the autonomous resource selection to the UE in Radio Resource Control (RRC)_CONNECTED by dedicated RRC signaling. This resource pool may be usable also when the UE is in RRC_IDLE.

When direct transmission is performed on a sidelink, a UE on a transmitting side (i.e., a D2D transmitting UE) (hereinafter referred to as a transmitting terminal) transmits Scheduling Assignment information by using a portion of radio resources (i.e., resource pool) for a sidelink control channel (i.e., PSCCH). The scheduling assignment information is also referred to as Sidelink Control Information (SCI) format 0. The scheduling assignment information includes contents such as resource block assignment and hopping allocation, a time resource pattern index, and a Modulation and Coding Scheme (MCS). In the case of the above-described scheduled resource allocation, the Resource block assignment and hopping allocation and the time resource pattern index indicated by the Scheduling Assignment (i.e., SCI format 0) follow the Resource block assignment and hopping allocation and the time resource pattern index indicated by the SL grant (i.e., DCI format 5) received from the eNB.

The transmitting terminal transmits data on the PSSCH by using a radio resource according to the scheduling assignment information. A UE on a receiving side (i.e., a D2D receiving UE) (hereinafter referred to as a receiving terminal) receives the scheduling assignment information from the transmitting terminal on the PSCCH and receives the data on the PSSCH according to the received scheduling assignment information. Note that the term "transmitting terminal" just focuses on a transmission operation of a wireless terminal and does not mean a radio terminal dedicated for transmission. Similarly, the term "receiving terminal" is an expression for expressing a receiving operation of a wireless terminal and does not mean a wireless terminal dedicated for reception. That is, the transmitting terminal is able to perform a receiving operation and the receiving terminal is able to perform a transmitting operation.

3GPP Release 12 further defines a partial coverage scenario where one UE is located outside the network coverage and another UE is located within the network coverage (see, for example, Sections 4.4.3, 4.5.4 and 5.4.4 of Non-Patent Literature 1). In the partial coverage scenario, the UE outside the coverage is referred to as a "remote UE" or a "sidelink remote UE", and the UE that is in coverage and performs relaying between the remote UE and the network is referred to as a "ProSe UE-to-Network Relay" or a "sidelink relay UE". The ProSe UE-to-Network Relay relays traffic (downlink and uplink) between the remote UE and the network (E-UTRA network (E-UTRAN) and EPC).

More specifically, the ProSe UE-to-Network Relay attaches to the network as a UE, establishes a PDN connection to communicate with a ProSe function entity or another Packet Data Network (PDN), and communicates with the ProSe function entity to start ProSe direct communication. The ProSe UE-to-Network Relay further performs the discovery procedure with the remote UE, communicates with the remote UE on the inter-UE direct interface (e.g., sidelink or PC5 interface), and relays traffic (downlink and uplink) between the remote UE and the network. When the Internet Protocol version 4 (IPv4) is used, the ProSe UE-to-Network Relay operates as a Dynamic Host Configuration Protocol Version 4 (DHCPv4) Server and Network Address Translation (NAT). When the IPv6 is used, the ProSe UE-to-Network Relay operates as a stateless DHCPv6 Relay Agent.

Further, in 3GPP Release 13, extensions of ProSe have been discussed (see, for example, Non-patent Literatures 3 to 9). This discussion includes a discussion about relay selection criteria for selecting a ProSe UE-to-Network Relay and a ProSe UE-to-UE Relay and a discussion about a relay selection procedure including arrangement of a relay selection. Note that the ProSe UE-to-UE Relay is a UE that relays traffic between two remote UEs.

Regarding the arrangement of the relay selection for the UE-to-Network Relay, a distributed relay selection architecture in which a remote UE selects a relay (see, for example, Non-patent Literatures 4-6, 8 and 9) and a centralized relay selection architecture in which an element in a network such as a base station (i.e., eNodeB (eNB)) selects a relay (see, for example, Non-patent Literatures 7 and 8) have been proposed. Regarding the criteria for the relay selection for the UE-to-Network Relay, it has been proposed to consider D2D link quality between a remote UE and a relay UE, consider backhaul link quality between a relay UE and an eNB, and consider both the D2D link quality and the backhaul link quality (see, for example, Non-patent Literatures 4 to 9).

In the specification, a radio terminal having the D2D communication capability and the relay capability, such as the ProSe UE-to-Network Relay (the sidelink relay UE), is referred to as a "relay terminal" or a "relay UE". Further, a radio terminal that receives a relay service provided by a relay UE is referred to as a "remote terminal" or a "remote UE". The remote terminal may also be referred to as a "relayed terminal".

CITATION LIST

Non Patent Literature

Non-patent Literature 1: 3GPP TS 23.303 V12.7.0 (2015-12), "3rd Generation Partnership Project; Technical Specification Group Services and System Aspects; Proximity-based services (ProSe); Stage 2 (Release 12)", December 2015

Non-patent Literature 2: 3GPP TS 36.213 V12.5.0 (2015-03), "3rd Generation Partnership Project; Technical Specification Group Radio Access Network; Evolved Universal Terrestrial Radio Access (E-UTRA); Physical layer procedures (Release 12)", March 2015

Non-patent Literature 3: 3GPP TR 23.713 V13.0.0 (2015-09), "3rd Generation Partnership Project; Technical Specification Group Services and System Aspects; Study on extended architecture support for proximity-based services (Release 13)", September 2015

Non-patent Literature 4: 3GPP R1-152778, "Support of UE-Network relays", Qualcomm Incorporated, May 2015

Non-patent Literature 5: 3GPP S2-150925, "UE-to-Network Relay conclusions", Qualcomm Incorporated, April 2015

Non-patent Literature 6: 3GPP R1-153087, "Discussion on UE-to-Network Relay measurement", Sony, May 2015

Non-patent Literature 7: 3GPP R2-152560, "Role of eNB when remote UE is in coverage", Qualcomm Incorporated, May 2015

Non-patent Literature 8: 3GPP R1-151965, "Views on UE-to-Network Relay Discovery", NTT DOCOMO, April 2015

Non-patent Literature 9: 3GPP R1-153188, "Discussion on Relay Selection", NTT DOCOMO, May 2015

SUMMARY OF INVENTION

Technical Problem

The aforementioned Non-patent Literatures do not describe that quality of uplink transmission from a relay UE to an eNB is considered when a radio resource for sidelink transmission from a remote UE to the relay UE is determined. When the bandwidth or throughput of sidelink transmission from a remote UE to a relay UE exceeds the bandwidth or throughput of uplink transmission from the relay UE to an eNB, it may cause an overflow in an uplink transmission buffer in the relay UE. Further, allocation of radio resources to sidelink transmission from a remote UE to a relay UE which provides an excessive sidelink throughput larger than an uplink throughput of the relay UE could cause a waste of sidelink radio resources.

One of the objects to be attained by embodiments disclosed herein is to provide an apparatus, a method, and a program that contribute to avoiding inconsistency of performance (e.g., bandwidth or throughput) between sidelink transmission from a remote terminal to a relay terminal and uplink transmission from the relay terminal to a base station. It should be noted that the above-described object is merely one of the objects to be attained by the embodiments disclosed herein. Other objects or problems and novel features will be made apparent from the following description and the accompanying drawings.

Solution to Problem

In a first aspect, an apparatus for controlling device-to-device communication includes a memory and at least one processor coupled to the memory. The at least one processor is configured to determine a device-to-device (D2D) radio resource to be allocated to one or more D2D transmissions from at least one remote terminal to a first relay terminal while considering a quality metric of an uplink from the first relay terminal to a base station.

In a second aspect, a method for controlling device-to-device communication includes: (a) obtaining a quality metric of an uplink from a first relay terminal to a base station; and (b) determining a device-to-device (D2D) radio resource to be allocated to one or more D2D transmissions from at least one remote terminal to the first relay terminal while considering the quality metric.

In a third aspect, a program includes a set of instructions (software codes) that, when loaded into a computer, causes the computer to perform a method according to the above-described second aspect.

Advantageous Effects of Invention

According to the above-described aspects, it is possible to provide an apparatus, a method, and a program that contribute to avoiding inconsistency of performance (e.g., bandwidth or throughput) between sidelink transmission from a remote terminal to a relay terminal and uplink transmission from the relay terminal to a base station.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following embodiments will be described on the assumption that they are implemented to 3GPP ProSe. However, these embodiments are not limited to the LTE-Advanced and its improvements and may also be applied to D2D communication in other mobile communication networks or systems.

First Embodiment

Figure 1:
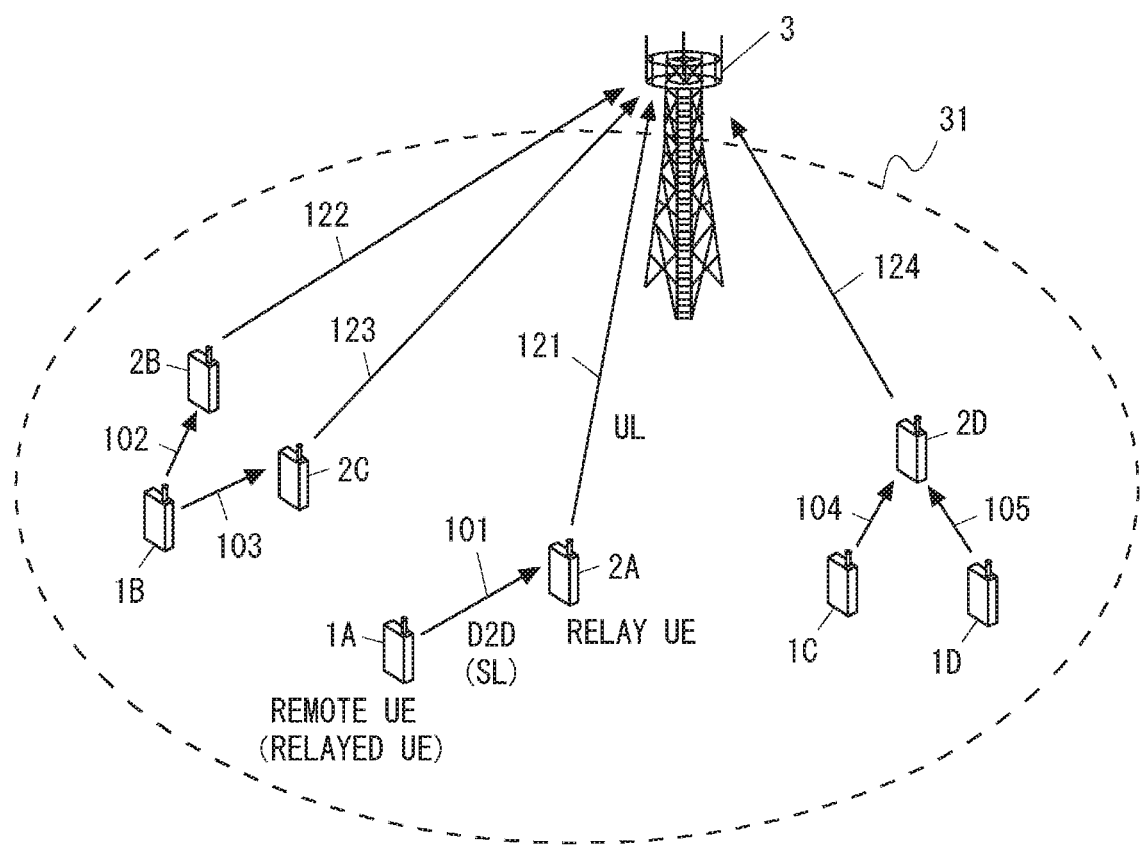
FIG. 1 is a diagram showing a configuration example of a radio communication network according to some embodiments.

FIG. 1 shows a configuration example of a radio communication network according to some embodiments including this embodiment. Specifically, FIG. 1 shows an example related to a UE-to-Network Relay (i.e., sidelink relay UE) and shows a plurality of remote UEs 1A, 1B, 1C and 1D, and a plurality of relay UEs 2A, 2B, 2C and 2D. In the following description, when matters common to a plurality of remote UEs including the remote UEs 1A, 1B, 1C and 1D are described, they are simply referred to as the "remote UE 1" by using a reference numeral "1". Similarly, when matters common to a plurality of relay UEs including the relay UEs 2A, 2B, 2C and 2D are described, they are simply referred to as the "relay UE 2" by using a reference numeral "2".

The remote UE 1 includes at least one radio transceiver and is configured to perform D2D communication with one or more relay UEs 2 on one or more D2D links (e.g., D2D link 101). As already described, the D2D link is referred to as a PC5 interface or a sidelink in the 3GPP. The D2D communication includes at least direct communication (i.e., ProSe Direct Communication) and may further include direct discovery (i.e., ProSe Direct Discovery). The ProSe Direct Communication is direct communication using sidelink transmission and is also referred to as Sidelink Direct Communication. Similarly, the ProSe Direct Discovery is direct discovery using sidelink transmission and is also referred to as Sidelink Direct Discovery. Further, the remote UE 1 is configured to perform cellular communication in a cellular coverage (i.e., cell) 31 provided by a base station (i.e., eNB) 3, though it is not shown in FIG. 1.

The relay UE 2 includes at least one radio transceiver and is configured to perform cellular communication with the base station 3 on a cellular link including an uplink and a downlink (e.g., cellular link 121) in the cellular coverage 31 and perform D2D communication (e.g., ProSe direct discovery and ProSe direct communication) with the remote UE 1 on a D2D link (e.g., D2D link 101).

The base station 3 is an entity disposed in a radio access network (i.e., E-UTRAN), provides the cellular coverage 31 including one or more cells, and is able to communicate with the relay UE 2 on a cellular link (e.g., cellular link 121) by using a cellular communication technology (e.g., E-UTRA technology). Further, the base station 3 is configured to perform cellular communication with the remote UE 1 when it is located within the cellular coverage 31.

FIG. 1 shows three relay scenarios. In the first example, one remote UE 1A is connected to one relay UE 2A. The remote UE 1A transmits data on the D2D link 101 and the relay UE 2A then transmits the data received from the remote UE 1A to the base station 3 on the cellular link 121 (i.e., uplink). In the second example, one remote UE 1B is connected to a plurality of relay UEs 2B and 2C. The remote UE 1B transmits data on two D2D links 102 and 103, and then the relay UEs 2B and 2C transmit the data received from the remote UE 1B to the base station 3 on their cellular links 122 and 123 (i.e., uplinks). In the third example, two remote UEs 1C and 1D are connected to one relay UE 2D. The remote UEs 1C and 1D transmit data on their respective D2D links 104 and 105, and the relay UE 2D transmits the data received from the two remote UEs 1C and 1D to the base station 3 on its cellular link 124 (i.e., uplink). In this embodiment, only one of these three relay scenarios shown in FIG. 1 may be used, or two or all of these three relay scenarios may be used.

Next, radio resource allocation to sidelink transmission according to this embodiment is described. In some implementations, the scheduled resource allocation (i.e., sidelink transmission mode 1) may be used. In the case of the scheduled resource allocation, the base station 3 determines a radio resource(s) to be allocated to sidelink transmission from the remote UE 1 to the relay UE 2. For example, the remote UE 1 transmits a scheduling request for requesting an uplink (UL) data transmission resource (i.e., Uplink Shared Channel (UL-SCH) resource) to the base station 3 and transmits a Sidelink BSR to the base station 3 using the UL data transmission resource allocated by an uplink grant (i.e., UL grant). The base station 3 determines a sidelink transmission resource to be allocated to the remote UE 1 based on the Sidelink BSR and transmits a sidelink grant (i.e., an SL grant, or DCI format 5) to the UE. As already described, the sidelink grant designates a radio resource of a PSSCH to be used by a sidelink transmission terminal (i.e., the remote UE 1 in this example) to perform direct transmission.

In other implementations, the autonomous resource selection (i.e., sidelink transmission mode 2) may be used. In the case of the autonomous resource selection, the base station 3 notifies a sidelink transmission terminal (i.e., the remote UE 1 in this example) of a radio resource pool (i.e., PSSCH subframe pool and resource block pool) that is allowed to be used for direct transmission, via an SIB 18 or dedicated signaling (RRC signaling). The sidelink transmission terminal (i.e., the remote UE 1) autonomously selects resources for sidelink control (i.e., PSCCH) and data (i.e., PSSCH) from the radio resource pool that has been set by the base station 3.

Figure 2:
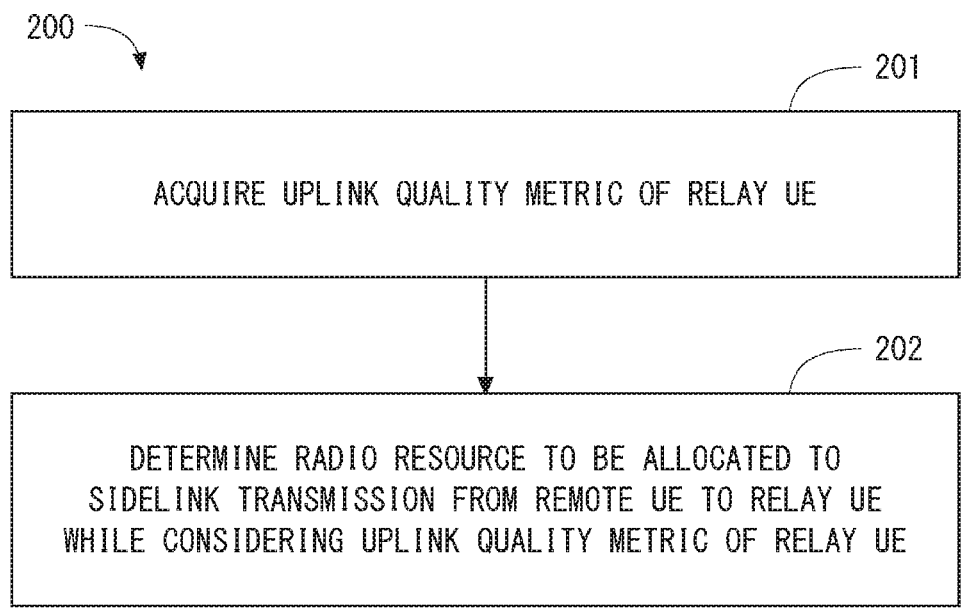
FIG. 2 is a flowchart showing an example of a radio resource allocation procedure according to a first embodiment.

FIG. 2 is a flowchart showing a process 200 that is an example of a procedure for allocating a radio resource to sidelink transmission from the remote UE 1 to the relay UE 2 according to this embodiment. In Step 201, a sidelink control entity acquires an uplink quality metric of the relay UE 2. The sidelink control entity is configured to determine a radio resource to be used for sidelink transmission. In some implementations in which the scheduled resource allocation is used, the sidelink control entity may be disposed in a network (e.g., in the base station 3). In contrast, in some implementations in which the autonomous resource selection is used, the sidelink control entity may be disposed in the remote UE 1.

The uplink quality metric of the relay UE 2 is related to performance (e.g., bandwidth or throughput) of uplink transmission from the relay UE 2 to the base station 3. The uplink quality metric of the relay UE 2 is based on, for example, at least one of an estimated bandwidth of the uplink, an estimated throughput of the uplink, an estimated amount of radio resources to be allocated to the uplink, an estimated Modulation and Coding Scheme (MCS) to be applied to the uplink, and an estimated pathloss from the relay UE 2 to the base station 3.

The sidelink control entity may receive the uplink quality metric of the relay UE 2 from the relay UE 2. When the sidelink control entity is implemented in the remote UE 1, the sidelink control entity may receive the uplink quality metric of the relay UE 2 from the base station 3. Alternatively, the sidelink control entity may estimate the uplink quality metric by itself.

In Step 202, the sidelink control entity determines a radio resource to be allocated to the sidelink transmission from the remote UE 1 to the relay UE 2 while considering the uplink quality metric of the relay UE 2. In some implementations, the sidelink control entity may determine a radio resource to be allocated to a sidelink transmission from the remote UE 1 to the relay UE 2 in a manner such that performance (e.g., bandwidth or throughput) of this sidelink transmission becomes consistent with performance of uplink transmission from the relay UE 2 to the base station 3. In other words, the sidelink control entity may determine a radio resource to be allocated to one or more sidelink transmissions related to one relay UE 2 in a manner such that performance (e.g., bandwidth or throughput) of these sidelink transmissions becomes roughly equal to or lower than performance of uplink transmission of the relay UE 2.

Specifically, the sidelink control entity may determine a target bandwidth or target throughput of each of sidelinks between at least one remote UE 1 and the relay UE 2 based on an estimated bandwidth or estimated throughput of the uplink of the relay UE 2. Then, the sidelink control entity may determine a radio resource to be allocated to each D2D transmission based on the determined target bandwidth or the target throughput. In the case where one relay UE 2 provides relaying for a plurality of remote UEs 1, the sidelink control entity may determine sidelink radio resources in a manner such that the sum of average bandwidths or average throughputs of a plurality of sidelink transmissions from the plurality of remote UE 1 to the relay UE 2 does not exceed an estimated bandwidth or estimated throughput of uplink transmission of the relay UE 2.

As understood from the above description, in the radio resource allocation procedure described above with reference to FIG. 2, the uplink quality metric of the relay UE 2 (i.e., performance of uplink transmission of the relay UE 2) is taken into consideration in radio resource allocation to sidelink transmission from the remote UE 1 to the relay UE 2. It is thus possible to determine a radio resource for sidelink transmission from the remote UE 1 to the relay UE 2 in a manner such that performance (e.g., bandwidth or throughput) of the sidelink transmission becomes consistent with performance of uplink transmission from the relay UE 2 to the base station 3. Accordingly, the radio resource allocation procedure described above with reference to FIG. 2 can contribute to avoiding inconsistency of performance (e.g., bandwidth or throughput) between sidelink transmission from the remote UE 1 to the relay UE 2 and uplink transmission from the relay UE 2 to the base station 3.

Figure 3:
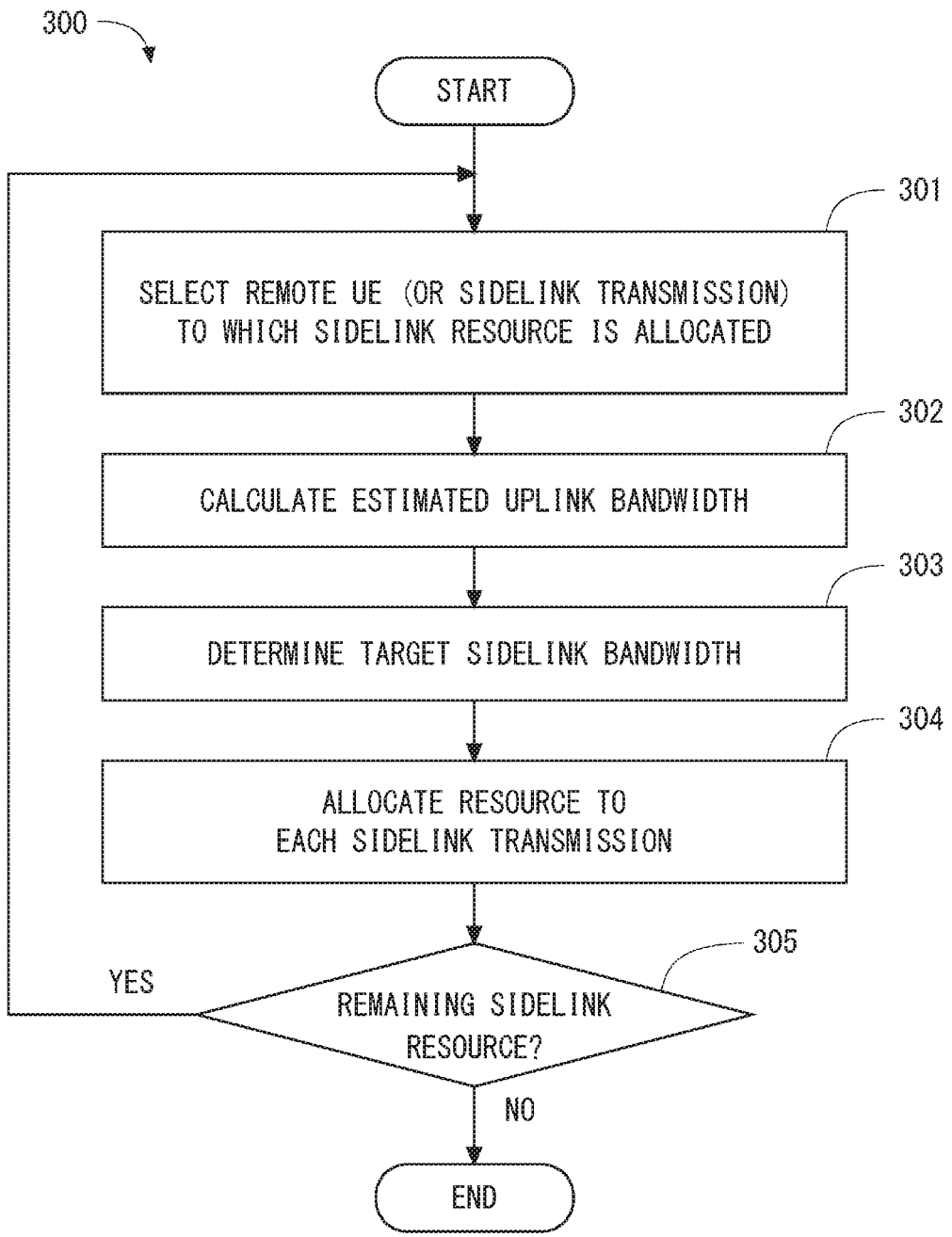
FIG. 3 is a flowchart showing an example of a radio resource allocation procedure according to the first embodiment.

FIG. 3 shows a process 300 that is a more specific example of the radio resource allocation procedure shown in FIG. 2. The procedure shown in FIG. 3 is performed by a base station 3 that performs the scheduled resource allocation. In Step 301, the base station 3, which serves as the sidelink control entity, selects a remote UE 1 to which a sidelink radio resource is allocated. Note that as already described, the remote UE 1 (e.g., the remote UE 1B shown in FIG. 1) may be configured to simultaneously perform a plurality of sidelink transmissions. In this case, in Step 301, one of sidelink transmissions to which a sidelink radio resource is allocated may be selected.

In Step 302, the base station 3 estimates an uplink bandwidth of the relay UE 2 that the remote UE 1 (or the sidelink transmission) selected in Step 301 can use. For example, the base station 3 calculates an estimated uplink bandwidth of the relay UE 2 based on uplink radio resources allocated to other UEs in the cellular coverage 31 and based on an estimated uplink pathloss from the relay UE 2 to the base station 3. When the base station 3 has already allocated radio resources to other sidelink transmissions related to the relay UE 2, the base station 3 further considers uplink bandwidths that are consumed to transfer data related to these other sidelink transmissions.

In Step 303, the base station 3 determines a target sidelink bandwidth for the remote UE 1 (or for the sidelink transmission) while considering the estimated uplink bandwidth calculated in Step 302. For example, the base station 3 sets the target sidelink bandwidth to a value equal to or lower than the minimum value among a guaranteed bandwidth of the remote UE 1 (or the sidelink transmission) and the estimated uplink bandwidth.

In Step 304, the base station 3 allocates to the remote UE 1 (or the sidelink transmission) a radio resource according to the target sidelink bandwidth determined in Step 303. When there are remaining sidelink radio resources, the base station 3 returns to Step 301 and continues the allocation of sidelink radio resources (step 305).

Note that the procedure shown in FIG. 3 is merely an example. For example, the procedure for determining a target sidelink bandwidth including Steps 302 and 303 may be performed prior to or in parallel with the sidelink radio resource allocation procedure including Steps 301, 304 and 305. In this case, the procedure for determining a target sidelink bandwidth including Steps 302 and 303 may be performed by an entity (e.g., a computer) different from the entity that performs the sidelink radio resource allocation procedure including Steps 301, 304 and 305.

Second Embodiment

This embodiment provides a modified example of the procedure for allocating a radio resource to sidelink transmission described in the first embodiment. A configuration example of a radio communication network according to this embodiment is similar to that shown in FIG. 1.

In this embodiment, the sidelink control entity (e.g., the base station 3) is configured to determine priorities related to radio resource allocation among a plurality of sidelink transmissions from a plurality of remote UEs 1 to a plurality of relay UEs 2, while considering one or both of a usage status of uplink radio resources and a usage status of sidelink radio resources in the cellular coverage 31 of the base station 3. The usage status of uplink radio resources may be an amount of used uplink radio resources or a usage ratio thereof in the cellular coverage 31. Similarly, the usage status of sidelink radio resources may be an amount of used sidelink radio resources or a usage ratio thereof in the cellular coverage 31.

For example, in a situation where the usage ratio of uplink radio resources in the cell coverage 31 is high, it is preferable to allocate a sidelink radio resource to sidelink transmission related to a relay UE 2 having high uplink quality preferentially over sidelink transmission related to a relay UE 2 having lower uplink quality. This is because the relay UE 2 having high uplink quality has a throughput per resource block higher than those of other relay UEs 2 having low uplink quality. The relay UE 2 having high uplink quality can effectively use remaining few uplink radio resources for relay communication.

In contrast to this, in a situation where the usage ratio of sidelink radio resources in the cell coverage 31 is high, it is preferable to allocate a sidelink radio resource to sidelink transmission in which sidelink quality is high preferentially over sidelink transmission in which sidelink quality is low. This is because the sidelink having high sidelink quality has a throughput per resource block higher than those of other sidelinks having low sidelink quality. The sidelink having high sidelink quality can effectively use remaining few sidelink radio resources for relay communication.

Figure 4:
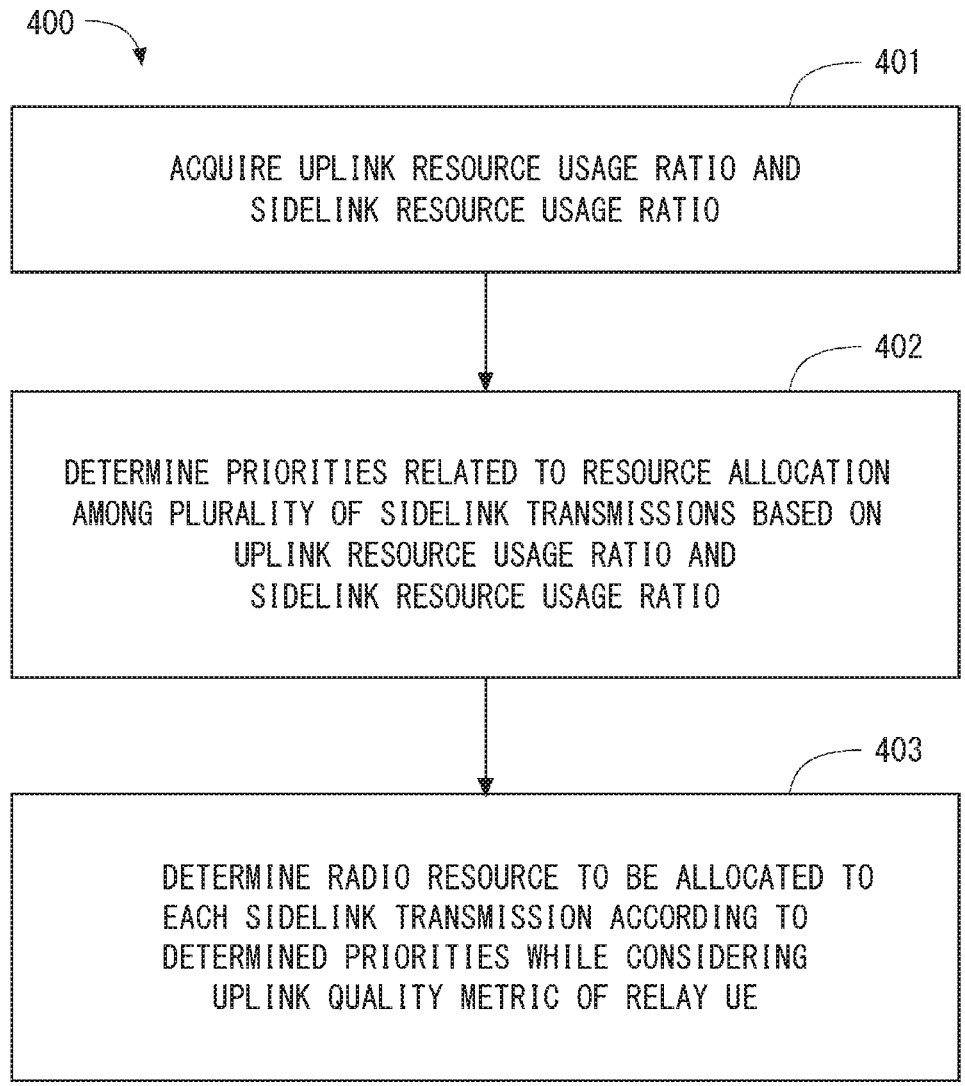
FIG. 4 is a flowchart showing an example of a radio resource allocation procedure according to a second embodiment.

FIG. 4 is a flowchart showing a process 400 that is an example of a procedure for allocating a radio resource to sidelink transmission from the remote UE 1 to the relay UE 2 according to this embodiment. In Step 401, the sidelink control entity (e.g., the base station 3) acquires a usage ratio of uplink radio resources and a usage ratio of sidelink radio resources in the cellular coverage 31. In Step 402, the sidelink control entity determines priorities related to resource allocation among a plurality of sidelink transmissions based on the usage ratio of uplink radio resources and the usage ratio of sidelink radio resources. In Step 403, the sidelink control entity determines a radio resource to be allocated to each sidelink transmission according to the priorities determined in Step 402 while considering an uplink quality metric (e.g., throughput or bandwidth) of the relay UE 2.

Figure 5:
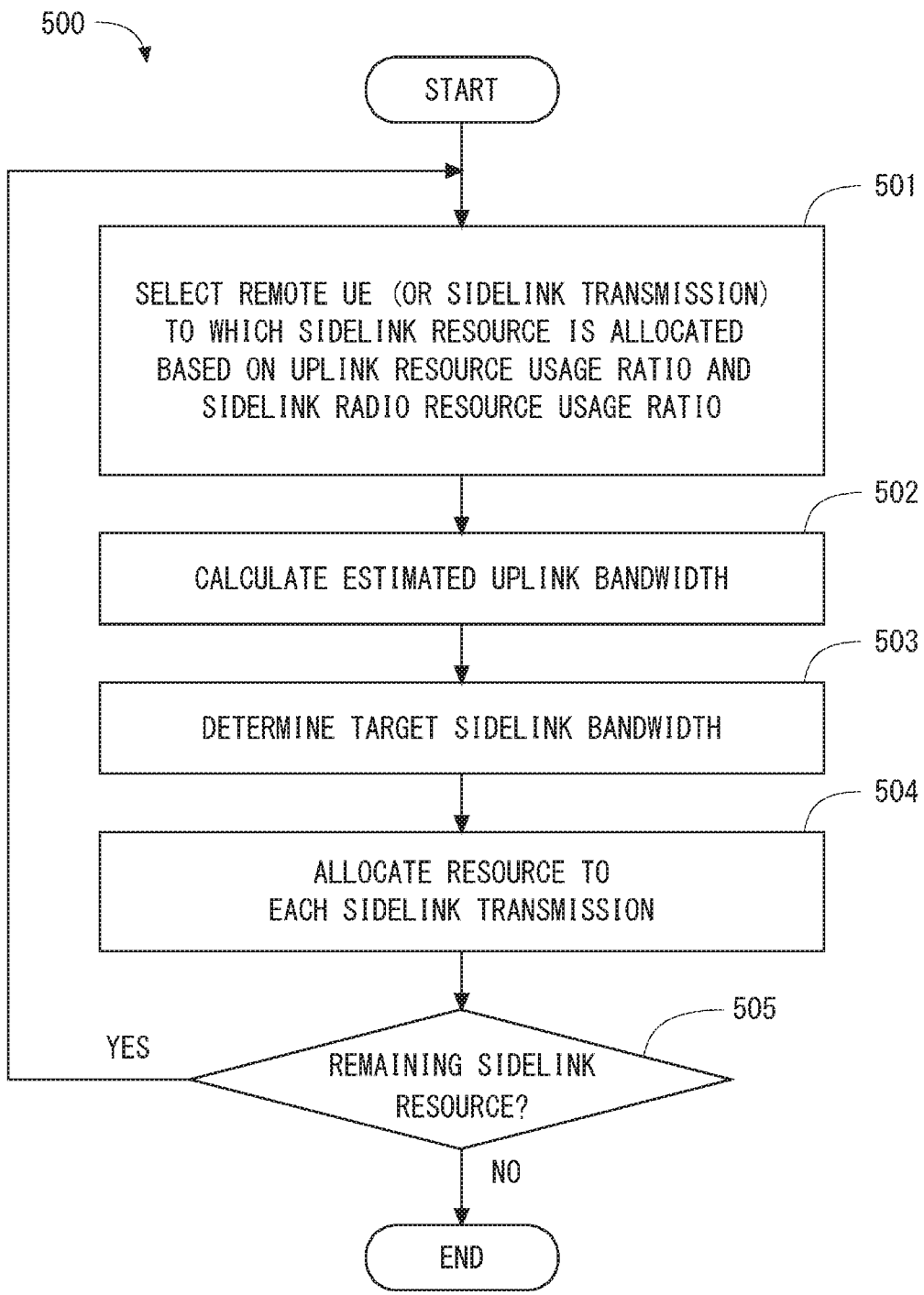
FIG. 5 is a flowchart showing an example of a radio resource allocation procedure according to the second embodiment.

FIG. 5 shows a process 500 that is a more specific example of the radio resource allocation procedure shown in FIG. 4. The procedure shown in FIG. 5 is performed by a base station 3 that performs the scheduled resource allocation. In Step 501, the base station 3, which serves as the sidelink control entity, selects a remote terminal (or sidelink transmission) to which a sidelink radio resource is allocated based on the uplink radio resource usage ratio and the sidelink radio resource usage ratio. Steps 502 to 505 are similar to Steps 302 to 305 shown in FIG. 3.

In Step 501, for example, the base station 3 may compare the usage ratio of uplink radio resources with the usage ratio of sidelink radio resources to select the higher one of these two usage ratio. When the usage ratio of uplink radio resources is higher than the usage ratio of sidelink radio resources, the base station 3 selects sidelink transmissions in a descending order from a sidelink transmission related to a relay UE 2 having the highest estimated uplink throughput per resource block (or having the largest estimated bandwidth). In this way, it is possible to reduce an amount of consumed uplink radio resources. On the other hand, when the usage ratio of sidelink radio resources is higher than the usage ratio of uplink radio resources, the base station 3 selects sidelinks in a descending order from a sidelink having the highest estimated sidelink throughput per resource block (or having the largest estimated bandwidth). In this way, it is possible to reduce an amount of consumed sidelink radio resources.

Third Embodiment

This embodiment provides a modified example of the procedure for allocating a radio resource to sidelink transmission described in the first and second embodiments. A configuration example of a radio communication network according to this embodiment is similar to that shown in FIG. 1.

In this embodiment, the sidelink control entity (e.g., the base station 3) is configured to determine an allocation ratio of D2D radio resources among a plurality of sidelink transmissions from a plurality of remote UEs 1 to a plurality of relay UEs 2 according to an uplink quality metric ratio among a plurality of uplink transmissions from the plurality of relay UEs 2 to the base station 3. As already described, the uplink quality metric of each relay UE 2 is related to performance (e.g., bandwidth or throughput) of uplink transmission from the relay UE 2 to the base station 3. The uplink quality metric of each relay UE 2 is based on, for example, at least one of an estimated bandwidth of the uplink, an estimated throughput of the uplink, an estimated amount of radio resources to be allocated to the uplink, an estimated Modulation and Coding Scheme (MCS) to be applied to the uplink, and an estimated pathloss from the relay UE 2 to the base station 3.

Figure 6:
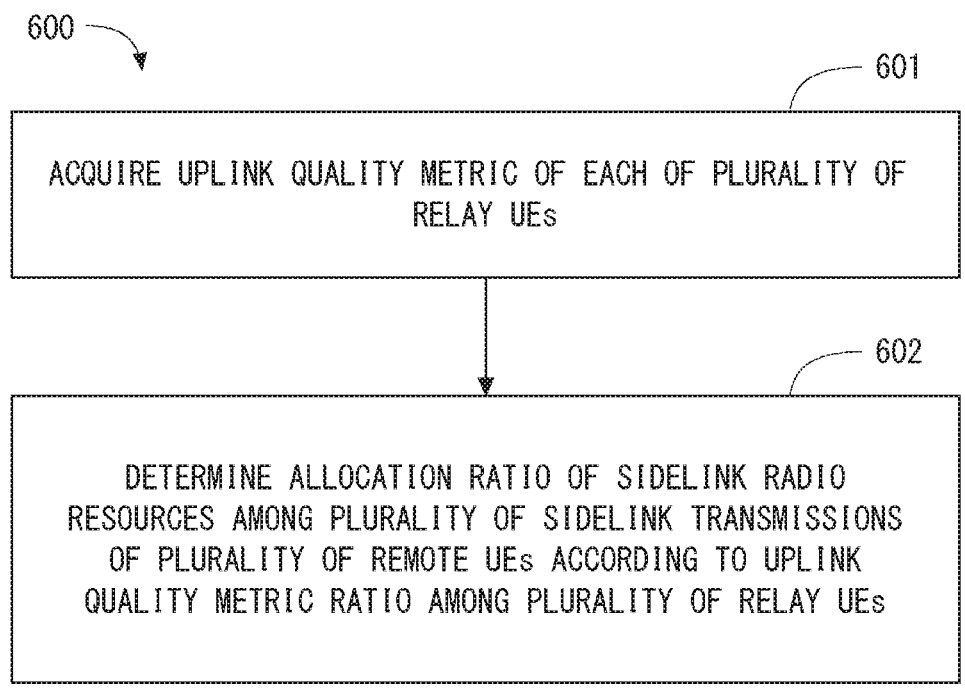
FIG. 6 is a flowchart showing an example of a radio resource allocation procedure according to a third embodiment.

FIG. 6 is a flowchart showing a process 600 that is an example of a procedure for allocating a radio resource to sidelink transmission from the remote UE 1 to the relay UE 2 according to this embodiment. In Step 601, the sidelink control entity (e.g., base station 3) acquires the uplink quality metric of each of a plurality of relay UEs 2. In Step 602, the sidelink control entity derives an uplink quality metric ratio among the plurality of relay UEs 2. The sidelink control entity then determines the allocation ratio of sidelink radio resources among a plurality of remote UEs 1 connected to the plurality of relay UEs 2, according to the uplink quality metric ratio among the plurality of relay UEs 2, For example, when the uplink quality ratio(s) (e.g., throughput ratio(s)) among four uplinks 121 to 124 of four relay UEs 2A, 2B, 2C and 2D shown in FIG. 1 is 1:2:3:4, the sidelink control entity (e.g., the base station 3) may determine radio resource allocation to five sidelink transmissions on five sidelinks (i.e., D2D links) 101 to 105 so that an allocation ratio(s) of sidelink radio resources among these five sidelinks becomes 1:2:3:2:2.

The sidelink control entity may consider the determined allocation ratio of sidelink radio resources to determine a target bandwidth or the maximum bandwidth that is used in radio resource allocation to each sidelink transmission. In other words, the sidelink control entity may allocate a radio resource to each sidelink transmission depending on a bandwidth or quality of the sidelink requested by the remote UE 1 and does not necessarily have to strictly comply with the determined resource allocation ratio.

As can be understood from the above description, the sidelink control entity according to this embodiment can determine radio resources for sidelink transmission in a manner such that a performance ratio among a plurality of sidelink transmissions from a plurality of remote UEs 1 to a plurality of relay UEs 2 becomes consistent with a performance ratio among uplink transmissions performed by the plurality of relay UEs 2. The radio resource allocation procedure described in this embodiment can thus contribute to avoiding inconsistency of performance (e.g., bandwidth or throughput) between sidelink transmission from the remote UE 1 to the relay UE 2 and uplink transmission from the relay UE 2 to the base station 3.

Note that in the radio resource allocation procedure described in the first embodiment, in an example, radio resources to be allocated to one or more sidelink transmissions related to one relay UE 2 are determined in a manner such that the sum of the performances of the sidelink transmissions becomes roughly equal to or lower than the performance of uplink transmission of the relay UE 2. According to this procedure, there is a possibility that when the performances of uplink transmissions of a plurality of relay UE 2 are not sufficient, remaining unused sidelink radio resources could increase. In contrast to this, the radio resource allocation procedure described in this embodiment allocates a sidelink radio resource to each remote UE 1 depending on the uplink quality ratio among a plurality of relay UEs 2. The radio resource allocation procedure according to this embodiment can thus contribute to effective use of sidelink radio resources.

Fourth Embodiment

This embodiment provides a modified example of the procedure for allocating a radio resource to sidelink transmission described in the first to third embodiments. A configuration example of a radio communication network according to this embodiment is similar to that shown in FIG. 1.

Figure 7:
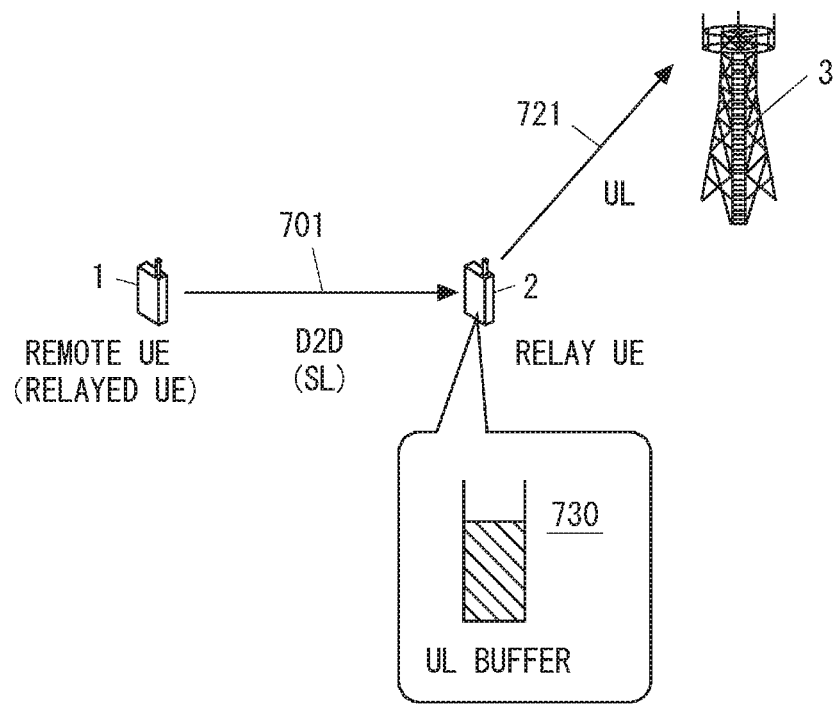
FIG. 7 is a diagram for explaining an outline of a radio resource allocation procedure according to a fourth embodiment.

An outline of a radio resource allocation procedure according to this embodiment is described hereinafter with reference to FIG. 7. In FIG. 7, a remote UE 1 transmits data to a relay UE 2 on a sidelink 701 and then the relay UE 2 transmits the data received from the remote UE 1 to a base station 3 on an uplink 721. As described in the first to third embodiments, the sidelink control entity (e.g., the base station 3 or the remote UE 1) determines a sidelink radio resource to be allocated to sidelink transmission from the remote UE 1 to the relay UE 2 while considering a quality metric of the uplink from the relay UE 2 to the base station 3. However, a situation where the sidelink reception throughput of the relay UE 2 exceeds the uplink transmission throughput could occur due to some reasons. For example, it is conceivable that an estimated uplink throughput cannot be obtained due to a change in the quality of the uplink 721. In this case, an amount of data buffered in an uplink transmission buffer 730 in the relay UE 2 increases, thus raising a possibility that packets could be discarded due to an overflow in the buffer in the worst case. The uplink transmission buffer 730 is used to store data to be transmitted on the uplink. The uplink transmission buffer 730 stores pending uplink data to be transmitted.

To cope with this problem, the sidelink control entity (e.g., the base station 3 or the remote UE 1) according to this embodiment further considers a buffer status of the uplink transmission buffer 730 in the relay UE 2 in order to determine a sidelink radio resource to be allocated to the remote UE 1.

Figure 8:
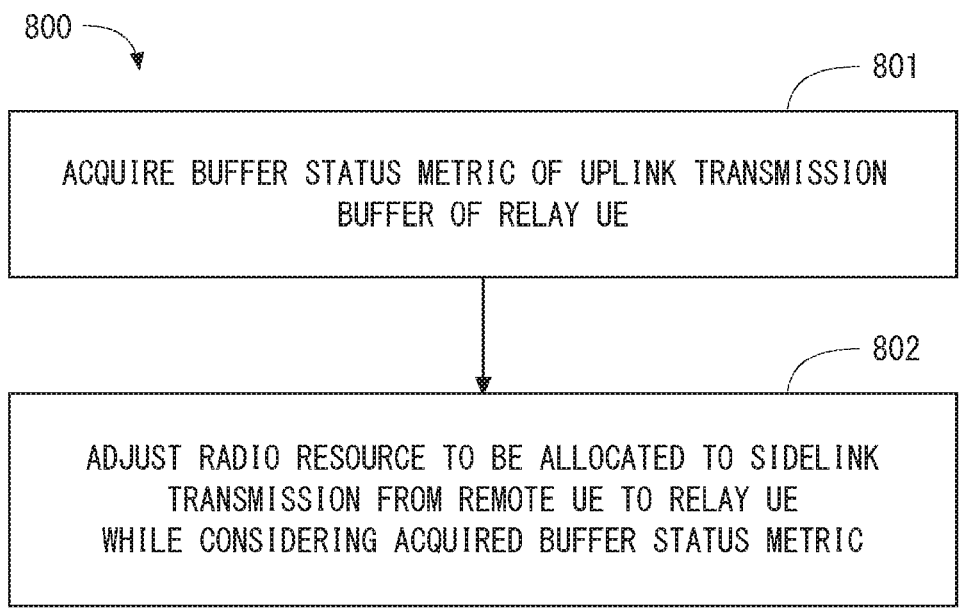
FIG. 8 is a flowchart showing an example of a radio resource allocation procedure according to the fourth embodiment.

FIG. 8 is a flowchart showing a process 800 that is an example of a procedure for allocating a radio resource to sidelink transmission according to this embodiment. In Step 801, the sidelink control entity acquires a buffer status metric related to the uplink transmission buffer 730 of the relay UE 2. The buffer status metric indicates an amount of pending uplink data stored in the uplink transmission buffer 730 or an occupation level of the uplink transmission buffer 730.

The sidelink control entity may receive a buffer status report containing the buffer status metric from the relay UE 2. The buffer status report may be transmitted periodically or aperiodically in response to a predetermined trigger event. Alternatively, the sidelink control entity may calculate the buffer status metric by itself. For example, the base station 3, which serves as the sidelink control entity, may calculate the buffer status metric of the uplink transmission buffer 730 in the relay UE 2 based on a history of sidelink radio resources allocated to the remote UE 1 and a history of uplink radio resources allocated to the relay UE 2.

In Step 802, the sidelink control entity adjusts a radio resource to be allocated to sidelink transmission from the remote UE 1 to the relay UE 2 while considering the acquired buffer status metric. In some implementations, the sidelink control entity may reduce an amount of radio resources to be allocated to sidelink transmission from the remote UE 1 to the relay UE 2 when the buffer status metric of the uplink transmission buffer 730 exceeds a predetermined threshold. In this way, it is possible to contribute to prevention of an overflow in the uplink transmission buffer 730.

For example, the sidelink control entity may use the buffer status metric of the uplink transmission buffer 730 in the calculation of the estimated uplink bandwidth shown in Step 302 in FIG. 3 or Step 502 in FIG. 5. Specifically, the sidelink control entity may reduce the estimated uplink bandwidth of the relay UE 2 in response to an increase in the buffer status metric of the uplink transmission buffer 730, i.e., in response to an increase in the amount of pending uplink data in the relay UE 2.

Fifth Embodiment

Figure 9:
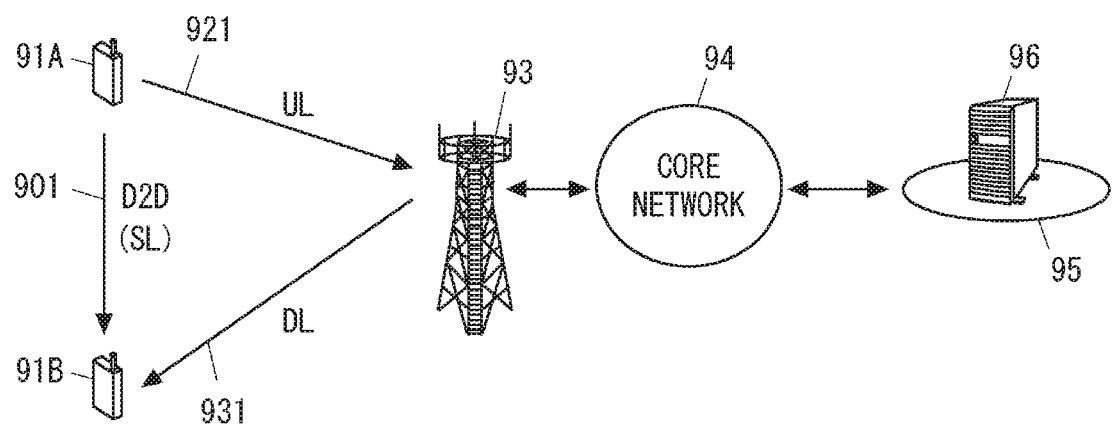
FIG. 9 is a diagram showing a configuration example of a radio communication network according to a fifth embodiment.

This embodiment provides a modified example of the second embodiment. FIG. 9 shows a configuration example of a radio communication network according to this embodiment. Each of UEs 91A and 91B includes at least one radio transceiver and is configured to perform cellular communication with a base station 93. The UEs 91A and 91B can communicate with a node 96 in an external network 95 through a cellular network including the base station 93 and a core network 94. Further, the UEs 91A and 91B are configured to perform D2D communication (i.e., sidelink communication) without traversing the base station 93.

Figure 10:
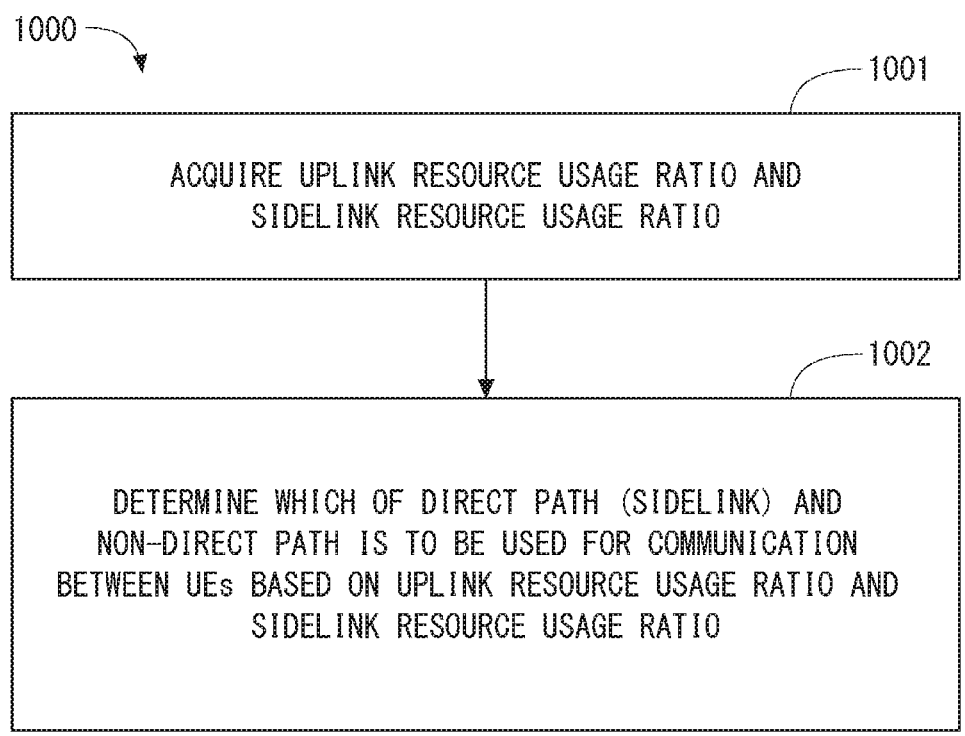
FIG. 10 is a flowchart showing an example of a procedure for controlling a transmission path of a remote terminal according to the fifth embodiment.

Next, a procedure for controlling a communication path of the UE 91A according to this embodiment is described. In this example, data transmission from the UE 91A to the UE 91B is assumed. FIG. 10 shows a process 1000 that is an example of a procedure performed by a sidelink control entity (e.g., the base station 93 or the UE 91A) according to this embodiment.

In Step 1001, the sidelink control entity acquires a usage status of uplink radio resources and a usage status of sidelink radio resources in a cell of the base station 93. Similarly to the second embodiment, the usage status of uplink radio resources may be an amount of used uplink radio resources or a usage ratio thereof in the cellular coverage 31. Similarly, the usage status of sidelink radio resources may be an amount of used sidelink radio resources or a usage ratio thereof in the cellular coverage 31.

In Step 1002, the sidelink control entity determines which of the direct path between the UEs 91A and 91B (i.e., sidelink 901) and the non-direct path through the base station 93 is to be used for data transmission from the UE 91A to the UE 91B, while considering the acquired usage status of uplink radio resources and the usage status of sidelink radio resources. The non-direct path includes an uplink 921 from the UE 91A to the base station 93 and a downlink 931 from the base station 93 to the UE 91B. Further, the non-direct path may be a path through the core network 94, the external network 95, and the node 96. That is, communication between the UEs 91A and 91B using the non-direct path may be performed through the node 96.

For example, in a situation where the usage ratio of uplink radio resources in the cell of the base station 93 is high, the sidelink 901 is preferably used. In this way, it is possible to reduce an amount of consumed uplink radio resources. On the other hand, in a situation where the usage ratio of sidelink radio resources in the cell of the base station 93 is high, the non-direct path is preferably used. In this way, it is possible to reduce an amount of consumed sidelink radio resources.

More specifically, the sidelink control entity may compare the usage ratio of uplink radio resources and the usage ratio of sidelink radio resources to select the higher one of these two usage ratio. When the usage ratio of uplink radio resources is higher than the usage ratio of sidelink radio resources, the sidelink control entity may use direct transmission on the sidelink 901 for data transmission from the UE 91A to the UE 91B. On the other hand, when the usage ratio of sidelink radio resources is higher than the usage ratio of uplink radio resources, the sidelink control entity may use the non-direct path for data transmission from the UE 91A to the UE 91B.

When the sidelink control entity is implemented in the base station 93, it may operate as described below in order to conform data transmission performed by the UE 91A to a result of the communication path selection. In an example, the base station 93 may refuse a sidelink resource request from the UE 91A in order to trigger the UE 91A to perform transmission through the non-direct path. Alternatively, the base station 93 may transmit a message for triggering the UE 91A to perform transmission through the non-direct path to the UE 91A. This message may indicate: (a) sidelink transmission is temporarily suspended; (b) transmission of a sidelink resource request to the base station 93 is prevented; or (c) transmission through the non-direct path is recommended.

The base station 93 may transmit a predetermined message to the UE 91A in order to trigger the UE 91A to perform transmission through the sidelink 901. This message may indicate: (a) transmission of an uplink resource request to the base station 93 is prevented; or (b) sidelink transmission is recommended.

This embodiment can be implemented in combination with any of the first to fourth embodiments. Further, it should be noted that this embodiment can be implemented independently of the first to fourth embodiments. That is, the procedure for controlling a communication path of the UE 91 according to this embodiment can be performed independently of the sidelink radio resource allocation procedure described in the first to fourth embodiments and can provide unique advantageous effects different from those of the sidelink radio resource allocation procedure described in the first to fourth embodiments.

Figure 11:
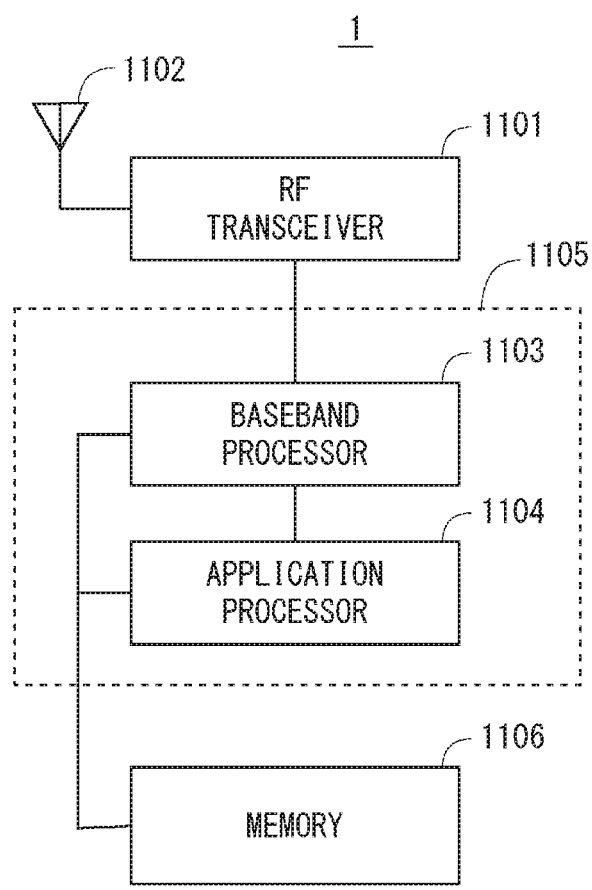
FIG. 11 is a block diagram showing a configuration example of a radio terminal according to some embodiments.

Lastly, configuration examples of the remote UE 1, the relay UE 2, the base station 3, the UE 91, and the base station 93 according to the above-described plurality of embodiments will be described. FIG. 11 is a block diagram showing a configuration example of the remote UE 1. Each of the relay UE 2 and the UE 91 may have a configuration similar to that shown in FIG. 11. A Radio Frequency (RF) transceiver 1101 performs an analog RF signal processing to communicate with the base station 3. The analog RF signal processing performed by the RF transceiver 1101 includes a frequency up-conversion, a frequency down-conversion, and amplification. The RF transceiver 1101 is coupled to an antenna 1102 and a baseband processor 1103. That is, the RF transceiver 1101 receives modulated symbol data (or OFDM symbol data) from the baseband processor 1103, generates a transmission RF signal, and supplies the generated transmission RF signal to the antenna 1102. Further, the RF transceiver 1101 generates a baseband reception signal based on a reception RF signal received by the antenna 1102 and supplies the generated baseband reception signal to the baseband processor 1103.

The RF transceiver 1101 may also be used for sidelink communication with other UEs. The RF transceiver 1101 may include a plurality of transceivers.

The baseband processor 1103 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE or LTE-Advanced, the digital baseband signal processing performed by the baseband processor 1103 may include signal processing of Packet Data Convergence Protocol (PDCP) layer, Radio Link Control (RLC) layer, MAC layer, and PHY layer. Further, the control-plane processing performed by the baseband processor 1103 may include processing of Non-Access Stratum (NAS) protocol, RRC protocol, and MAC CE.

The baseband processor 1103 may include a modem processor (e.g., Digital Signal Processor (DSP)) that performs the digital baseband signal processing and a protocol stack processor (e.g., Central Processing Unit (CPU) or a Micro Processing Unit (MPU)) that performs the control-plane processing. In this case, the protocol stack processor, which performs the control-plane processing, may be integrated with an application processor 1104 described in the following.

The application processor 1104 may also be referred to as a CPU, an MPU, a microprocessor, or a processor core. The application processor 1104 may include a plurality of processors (processor cores). The application processor 1104 loads a system software program (Operating System (OS)) and various application programs (e.g., voice call application, WEB browser, mailer, camera operation application, and music player application) from a memory 1106 or from another memory (not shown) and executes these programs, thereby providing various functions of the remote UE 1.

In some implementations, as represented by a dashed line (1105) in FIG. 11, the baseband processor 1103 and the application processor 1104 may be integrated on a single chip. In other words, the baseband processor 1103 and the application processor 1104 may be implemented in a single System on Chip (SoC) device 1105. A SoC device may be referred to as a system Large Scale Integration (LSI) or a chipset.

The memory 1106 is a volatile memory, a nonvolatile memory, or a combination thereof. The memory 1106 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1106 may include, for example, an external memory device that can be accessed by the baseband processor 1103, the application processor 1104, and the SoC 1105. The memory 1106 may include an internal memory device that is integrated in the baseband processor 1103, the application processor 1104, or the SoC 1105. Further, the memory 1106 may include a memory in a Universal Integrated Circuit Card (UICC).

The memory 1106 may store software modules (computer programs) including instructions and data to perform processing by the remote UE 1 described in the above embodiments. In some implementations, the baseband processor 1103 or the application processor 1104 may be configured to load these software modules from the memory 1106 and execute the loaded software modules, thereby performing the processing of the remote UE 1 described in the above embodiments with reference to the drawings.

Figure 12:
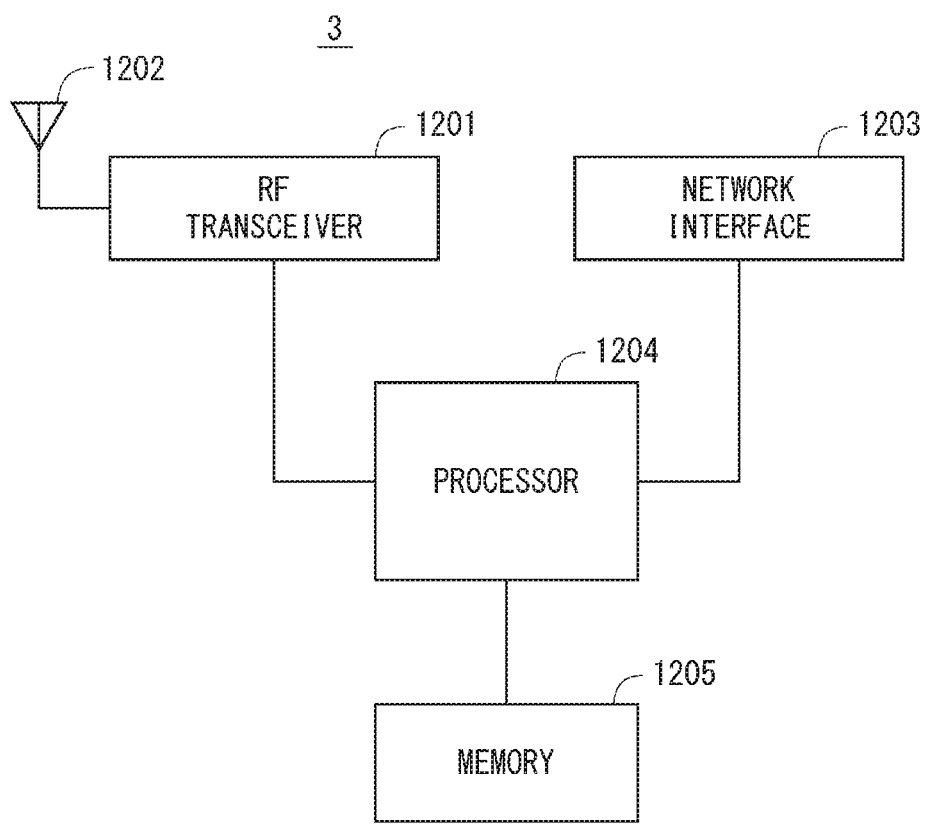
FIG. 12 is a block diagram showing a configuration example of a base station according to some embodiments.

FIG. 12 is a block diagram showing a configuration example of the base station 3 according to the above-described embodiments. The base station 93 may have a configuration similar to that shown in FIG. 12. As shown in FIG. 12, the base station 3 includes an RF transceiver 1201, a network interface 1203, a processor 1204, and a memory 1205. The RF transceiver 1201 performs analog RF signal processing to communicate with the remote UE 1 and the relay UE 2. The RF transceiver 1201 may include a plurality of transceivers. The RF transceiver 1201 is connected to an antenna 1202 and the processor 1204. The RF transceiver 1201 receives modulated symbol data (or OFDM symbol data) from the processor 1204, generates a transmission RF signal, and supplies the generated transmission RF signal to the antenna 1202. Further, the RF transceiver 1201 generates a baseband reception signal based on a reception RF signal received by the antenna 1202 and supplies this signal to the processor 1204.

The network interface 1203 is used to communicate with a network node (e.g., Mobility Management Entity (MME)

and Serving Gateway (S-GW)). The network interface 1203 may include, for example, a network interface card (NIC) conforming to the IEEE 802.3 series.

The processor 1204 performs digital baseband signal processing (data-plane processing) and control-plane processing for radio communication. For example, in the case of LTE or LTE-Advanced, the digital baseband signal processing performed by the processor 1204 may include signal processing of the PDCP layer, RLC layer, MAC layer, and PHY layer. Further, the control-plane processing performed by the processor 1204 may include processing of S1 protocol, RRC protocol, and MAC CE.

The processor 1204 may include a plurality of processors. For example, the processor 1204 may include a modem-processor (e.g., DSP) that performs the digital baseband signal processing, and a protocol-stack-processor (e.g., CPU or MPU) that performs the control-plane processing.

The memory 1205 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 1205 may include a storage located apart from the processor 1204. In this case, the processor 1204 may access the memory 1205 through the network interface 1203 or an I/O interface (not shown).

The memory 1205 may store software modules (computer programs) including instructions and data to perform processing by the base station 3 described in the above embodiments. In some implementations, the processor 1204 may be configured to load these software modules from the memory 1205 and execute the loaded software modules, thereby performing the processing of the base station 3 described in the above embodiments with reference to the drawings.

As described above with reference to FIGS. 11 and 12, each of the processors included in the remote UE 1, the relay UE 2, the base station 3, the UE 91, and the base station 93 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

Each of the above embodiments may be used individually, or two or more of the embodiments may be appropriately combined with one another.

The processes and operations, including the sidelink radio resource allocation, performed by the base station 3 described in the above embodiments may be provided by a Digital Unit (DU), or by a combination of the DU and a Radio Unit (RU), included in a Cloud Radio Access Network (C-RAN) architecture. The DU is also referred to as a Baseband Unit (BBU). The RU is also referred to as a Remote Radio Head (RRH) or Remote Radio Equipment (RRE). That is, the processes and operations performed by the base station 3 described in the above embodiments may be provided by one or a plurality of radio stations (i.e., RAN nodes).

Further, the above-described embodiments are merely examples of applications of the technical ideas obtained by the inventors. These technical ideas are not limited to the above-described embodiments and various modifications can be made thereto.

For example, the whole or part of the embodiments disclosed above can be described as, but not limited to, the following supplementary notes.

(Supplementary Note 1)

An apparatus for controlling device-to-device communication, comprising:

a memory; and at least one processor coupled to the memory and configured to determine a device-to-device (D2D) radio resource to be allocated to one or more D2D transmissions from at least one remote terminal to a first relay terminal while considering a quality metric of an uplink from the first relay terminal to a base station.

(Supplementary Note 2)

The apparatus described in Supplementary note 1, wherein the quality metric is based on at least one of an estimated bandwidth of the uplink, an estimated throughput of the uplink, an estimated amount of radio resources to be allocated to the uplink, an estimated Modulation and Coding Scheme (MCS) to be applied to the uplink, and an estimated pathloss from the first relay terminal to the base station.

(Supplementary Note 3)

The apparatus described in Supplementary note 1 or 2, wherein the quality metric includes an estimated bandwidth or estimated throughput of the uplink, and the at least one processor is configured to determine a target bandwidth or target throughput of each D2D link between each of the at least one remote terminal and the first relay terminal based on the estimated bandwidth or estimated throughput of the uplink and determine a D2D radio resource to be allocated to each D2D transmission based on the target bandwidth or the target throughput.

(Supplementary Note 4)

The apparatus described in any one of Supplementary notes 1 to 3, wherein the quality metric includes an estimated bandwidth or estimated throughput of the uplink, the at least one remote terminal comprises a plurality of remote terminals, and the at least one processor is configured to determine the D2D radio resource in a manner such that a sum of average bandwidths or average throughputs of a plurality of D2D links between the plurality of remote terminals and the first relay terminal does not exceed the estimated bandwidth or estimated throughput of the uplink.

(Supplementary Note 5)

The apparatus described in any one of Supplementary notes 1 to 4, wherein the at least one processor is configured to determine a priority related to D2D radio resource allocation among a plurality of sidelink transmissions from a plurality of remote terminals to a plurality of relay terminals including the first relay terminal while considering one or both of a usage status of uplink radio resources and a usage status of D2D radio resources in a cell of the base station.

(Supplementary Note 6)

The apparatus described in any one of Supplementary notes 1 to 5, wherein the at least one processor is configured to determine an allocation ratio of D2D radio resources among a plurality of sidelink transmissions from a plurality of remote terminals to a plurality of relay terminals including the first relay terminal according to a quality metric ratio among a plurality of uplinks from the plurality of relay terminals to the base station.

(Supplementary Note 7)

The apparatus described in any one of Supplementary notes 1 to 6, wherein the at least one processor is configured to further consider a buffer status of an uplink transmission buffer, which is included in the first relay terminal and is used to store data to be transmitted through the uplink, in order to determine the D2D radio resource.

(Supplementary Note 8)

The apparatus described in Supplementary note 7, wherein the at least one processor is configured to reduce allocation of the D2D radio resource when a buffer status metric related to an amount of pending uplink data to be transmitted stored in the uplink transmission buffer or an occupation level of the uplink transmission buffer exceeds a predetermined threshold.

(Supplementary Note 9)

The apparatus described in Supplementary note 7, wherein the at least one processor is configured to adjust the quality metric based on the buffer status and determine the D2D radio resource based on the adjusted quality metric.

(Supplementary Note 10)

The apparatus described in any one of Supplementary notes 1 to 9, wherein the at least one processor is configured to determine which of a device-to-device (D2D) link between first and second terminals and a non-direct path through the base station is to be used for data transmission from the first terminal to the second terminal while considering a usage status of uplink radio resources and a usage status of D2D radio resources in a cell of the base station, wherein the non-direct path includes an uplink from the first terminal to the base station and a downlink from the base station to the second terminal.

(Supplementary Note 11)

The apparatus described in any one of Supplementary notes 1 to 9, wherein the apparatus is implemented in the base station.

(Supplementary Note 12)

The apparatus described in any one of Supplementary notes 1 to 11, wherein the first relay terminal is configured to relay traffic between the at least one remote terminal and the base station through a backhaul link between the first relay terminal and the base station.

(Supplementary Note 13)

A method for controlling device-to-device communication, comprising:

obtaining a quality metric of an uplink from a first relay terminal to a base station; and determining a device-to-device (D2D) radio resource to be allocated to one or more D2D transmissions from at least one remote terminal to the first relay terminal while considering the quality metric.

(Supplementary Note 14)

The method described in Supplementary note 13, wherein the quality metric is based on at least one of an estimated bandwidth of the uplink, an estimated throughput of the uplink, an estimated amount of radio resources to be allocated to the uplink, an estimated Modulation and Coding Scheme (MCS) to be applied to the uplink, and an estimated pathloss from the first relay terminal to the base station.

(Supplementary Note 15)

The method described in Supplementary note 13 or 14, wherein the quality metric includes an estimated bandwidth or estimated throughput of the uplink, and the determining comprises determining a target bandwidth or target throughput of each D2D link between each of the at least one remote terminal and the first relay terminal based on the estimated bandwidth or estimated throughput of the uplink and determining a D2D radio resource to be allocated to each D2D transmission based on the target bandwidth or the target throughput.

(Supplementary Note 16)

The method described in any one of Supplementary notes 13 to 15, wherein the quality metric includes an estimated bandwidth or estimated throughput of the uplink, the at least one remote terminal comprises a plurality of remote terminals, and the determining comprises determining the D2D radio resource in a manner such that a sum of average bandwidths or average throughputs of a plurality of D2D links between the plurality of remote terminals and the first relay terminal does not exceed the estimated bandwidth or estimated throughput of the uplink.

(Supplementary Note 17)

The method described in any one of Supplementary notes 13 to 16, further comprising determining a priority related to D2D radio resource allocation among a plurality of sidelink transmissions from a plurality of remote terminals to a plurality of relay terminals including the first relay terminal while considering one or both of a usage status of uplink radio resources and a usage status of D2D radio resources in a cell of the base station.

(Supplementary Note 18)

The method described in any one of Supplementary notes 13 to 17, further comprising determining an allocation ratio of D2D radio resources among a plurality of sidelink transmissions from a plurality of remote terminals to a plurality of relay terminals including the first relay terminal according to a quality metric ratio among a plurality of uplinks from the plurality of relay terminals to the base station.

(Supplementary Note 19)

The method described in any one of Supplementary notes 13 to 18, wherein the determining comprises further considering a buffer status of an uplink transmission buffer, which is included in the first relay terminal and is used to store data to be transmitted through the uplink, in order to determine the D2D radio resource.

(Supplementary Note 20)

The method described in Supplementary note 19, wherein the considering the buffer status comprises reducing allocation of the D2D radio resource when a buffer status metric related to an amount of pending uplink data to be transmitted stored in the uplink transmission buffer or an occupation level of the uplink transmission buffer exceeds a predetermined threshold.

(Supplementary Note 21)

The method described in Supplementary note 19, wherein the considering the buffer status comprises adjusting the quality metric based on the buffer status and determining the D2D radio resource based on the adjusted quality metric.
(Supplementary Note 22)
A program for causing a computer to perform a method for controlling device-to-device communication, wherein the method comprises:
obtaining a quality metric of an uplink from a first relay terminal to a base station; and
determining a device-to-device (D2D) radio resource to be allocated to one or more D2D transmissions from at least one remote terminal to the first relay terminal while considering the quality metric.
(Supplementary Note 23)
An apparatus for controlling device-to-device communication, comprising:
a memory; and
at least one processor coupled to the memory and configured to determine which of a device-to-device (D2D) link between first and second terminals and a non-direct path through a base station is to be used for data transmission from the first terminal to the second terminal while considering a usage status of uplink radio resources and a usage status of D2D radio resources in a cell of the base station, wherein
the non-direct path includes an uplink from the first terminal to the base station and a downlink from the base station to the second terminal.

REFERENCE SIGNS LIST

1 REMOTE UE
2 RELAY UE
3 BASE STATION
91 UE
93 BASE STATION
94 CORE NETWORK
95 EXTERNAL NETWORK
96 NODE
1101 RADIO FREQUENCY (RF) TRANSCEIVER
1103 BASEBAND PROCESSOR
1104 APPLICATION PROCESSOR
1106 MEMORY
1204 PROCESSOR
1205 MEMORY

The invention claimed is:

1. An apparatus for controlling device-to-device communication, the apparatus comprising:
a memory; and
at least one processor coupled to the memory and configured to determine, using a quality metric of an uplink from a first relay terminal to a base station, a device-to-device (D2D) radio resource to be allocated to one or more D2D transmissions from at least one remote terminal to the first relay terminal.

2. The apparatus according to claim 1, wherein the quality metric is based on at least one of an estimated bandwidth of the uplink, an estimated throughput of the uplink, an estimated amount of radio resources to be allocated to the uplink, an estimated Modulation and Coding Scheme (MCS) to be applied to the uplink, and an estimated pathloss from the first relay terminal to the base station.

3. The apparatus according to claim 1, wherein
the quality metric includes an estimated bandwidth or estimated throughput of the uplink, and
the at least one processor is configured to determine a target bandwidth or target throughput of each D2D link between each of the at least one remote terminal and the first relay terminal based on the estimated bandwidth or estimated throughput of the uplink and determine a D2D radio resource to be allocated to each D2D transmission based on the target bandwidth or the target throughput.

4. The apparatus according to claim 1, wherein
the quality metric includes an estimated bandwidth or estimated throughput of the uplink,
the at least one remote terminal comprises a plurality of remote terminals, and
the at least one processor is configured to determine the D2D radio resource in a manner such that a sum of average bandwidths or average throughputs of a plurality of D2D links between the plurality of remote terminals and the first relay terminal does not exceed the estimated bandwidth or estimated throughput of the uplink.

5. The apparatus according to claim 1, wherein the at least one processor is configured to determine, using one or both of a usage status of uplink radio resources and a usage status of D2D radio resources in a cell of the base station, a priority related to D2D radio resource allocation among a plurality of sidelink transmissions from a plurality of remote terminals to a plurality of relay terminals including the first relay terminal.

6. The apparatus according to claim 1, wherein the at least one processor is configured to determine an allocation ratio of D2D radio resources among a plurality of sidelink transmissions from a plurality of remote terminals to a plurality of relay terminals including the first relay terminal according to a quality metric ratio among a plurality of uplinks from the plurality of relay terminals to the base station.

7. The apparatus according to claim 1, wherein the at least one processor is configured to further consider a buffer status of an uplink transmission buffer, which is included in the first relay terminal and is used to store data to be transmitted through the uplink, in order to determine the D2D radio resource.

8. The apparatus according to claim 7, wherein the at least one processor is configured to reduce allocation of the D2D radio resource when a buffer status metric related to an amount of pending uplink data to be transmitted stored in the uplink transmission buffer or an occupation level of the uplink transmission buffer exceeds a predetermined threshold.

9. The apparatus according to claim 7, wherein the at least one processor is configured to adjust the quality metric based on the buffer status and determine the D2D radio resource based on the adjusted quality metric.

10. The apparatus according to claim 1, wherein
the at least one processor is configured to determine, using a usage status of uplink radio resources and a usage status of D2D radio resources in a cell of the base station, which of a device-to-device (D2D) link between first and second terminals and a non-direct path through the base station is to be used for data transmission from the first terminal to the second terminal,
wherein the non-direct path includes an uplink from the first terminal to the base station and a downlink from the base station to the second terminal.

11. The apparatus according to claim 1, wherein the apparatus is implemented in the base station.

12. The apparatus according to claim 1, wherein the first relay terminal is configured to relay traffic between the at least one remote terminal and the base station through a backhaul link between the first relay terminal and the base station.

13. A method for controlling device-to-device communication, the method comprising:
   obtaining a quality metric of an uplink from a first relay terminal to a base station; and
   determining, using the quality metric of the uplink from the first relay terminal to the base station, a device-to-device (D2D) radio resource to be allocated to one or more D2D transmissions from at least one remote terminal to the first relay terminal.

14. The method according to claim 13, wherein the quality metric is based on at least one of an estimated bandwidth of the uplink, an estimated throughput of the uplink, an estimated amount of radio resources to be allocated to the uplink, an estimated Modulation and Coding Scheme (MCS) to be applied to the uplink, and an estimated pathloss from the first relay terminal to the base station.

15. The method according to claim 13, wherein
   the quality metric includes an estimated bandwidth or estimated throughput of the uplink, and
   the determining comprises determining a target bandwidth or target throughput of each D2D link between each of the at least one remote terminal and the first relay terminal based on the estimated bandwidth or estimated throughput of the uplink and determining a D2D radio resource to be allocated to each D2D transmission based on the target bandwidth or the target throughput.

16. The method according to claim 13, wherein
   the quality metric includes an estimated bandwidth or estimated throughput of the uplink,
   the at least one remote terminal comprises a plurality of remote terminals, and
   the determining comprises determining the D2D radio resource in a manner such that a sum of average bandwidths or average throughputs of a plurality of D2D links between the plurality of remote terminals and the first relay terminal does not exceed the estimated bandwidth or estimated throughput of the uplink.

17. The method according to claim 13, further comprising determining, using one or both of a usage status of uplink radio resources and a usage status of D2D radio resources in a cell of the base station, a priority related to D2D radio resource allocation among a plurality of sidelink transmissions from a plurality of remote terminals to a plurality of relay terminals including the first relay terminal.

18. The method according to claim 13, further comprising determining an allocation ratio of D2D radio resources among a plurality of sidelink transmissions from a plurality of remote terminals to a plurality of relay terminals including the first relay terminal according to a quality metric ratio among a plurality of uplinks from the plurality of relay terminals to the base station.

19. The method according to claim 13, wherein the determining comprises further considering a buffer status of an uplink transmission buffer, which is included in the first relay terminal and is used to store data to be transmitted through the uplink, in order to determine the D2D radio resource.

20. A non-transitory computer readable medium storing a program for causing a computer to perform a method for controlling device-to-device communication, wherein the method comprises:
   obtaining a quality metric of an uplink from a first relay terminal to a base station; and
   determining using the quality metric of the uplink from the first relay terminal to the base station, a device-to-device (D2D) radio resource to be allocated to one or more D2D transmissions from at least one remote terminal to the first relay terminal.

* * * * *